No. 807,863. PATENTED DEC. 19, 1905.
G. W. PHILLIPS.
COFFEE HOPPER.
APPLICATION FILED JUNE 3, 1905.
2 SHEETS—SHEET 1.
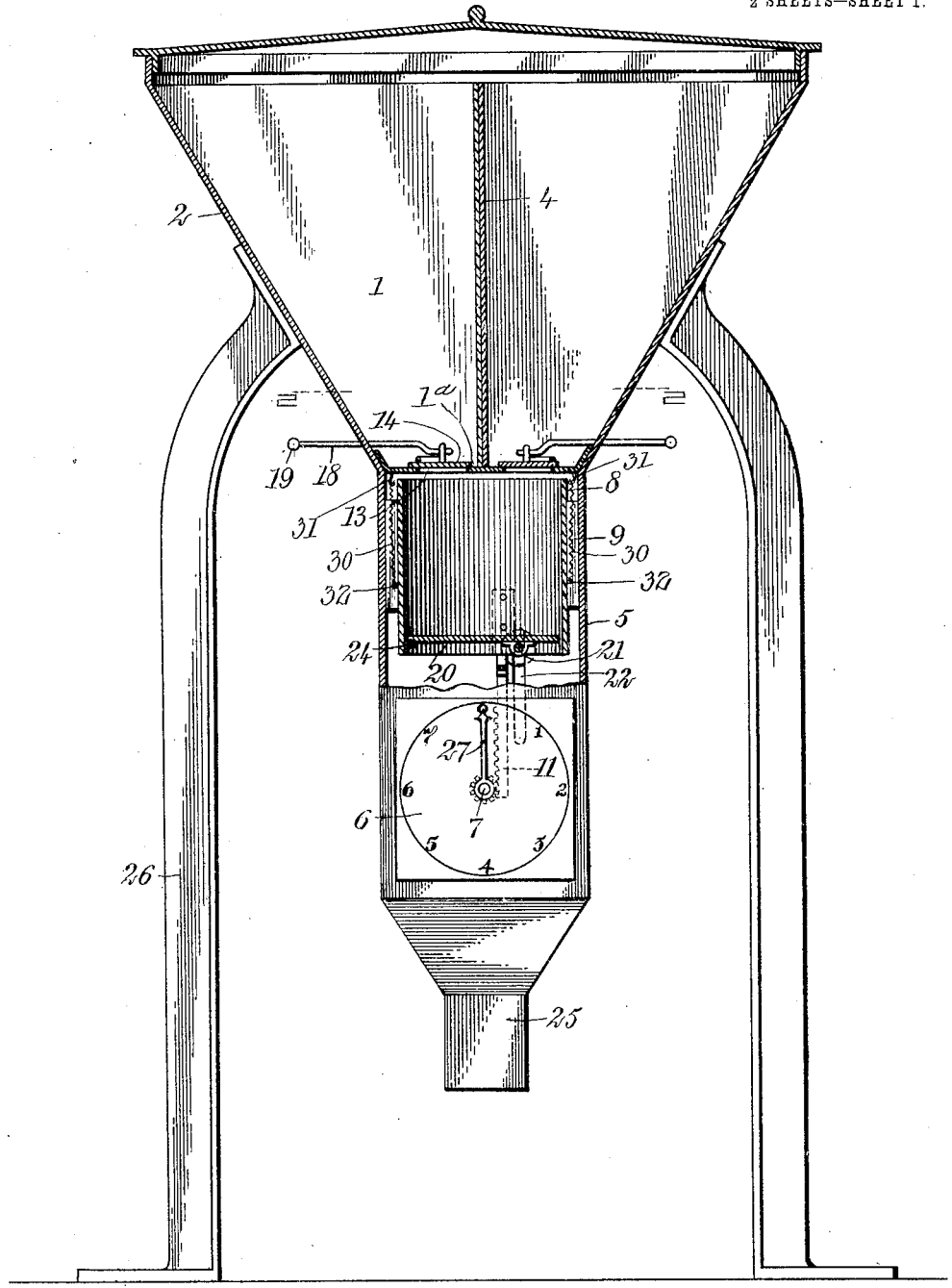
Fig. 1
WITNESSES:
C. A. Jarvis.
INVENTOR
George W. Phillips
BY
ATTORNEYS No. 807,863. PATENTED DEC. 19, 1905.
G. W. PHILLIPS.
COFFEE HOPPER.
APPLICATION FILED JUNE 3, 1905.

2 SHEETS—SHEET 2.

WITNESSES:

INVENTOR
George W. Phillips
BY
ATTORNEYS

UNITED STATES PATENT OFFICE.

GEORGE W. PHILLIPS, OF MIANUS, CONNECTICUT.

COFFEE-HOPPER.

No. 807,863.          Specification of Letters Patent.          Patented Dec. 19, 1905.

Application filed June 3, 1905. Serial No. 263,658.

*To all whom it may concern:*

Be it known that I, GEORGE W. PHILLIPS, a citizen of the United States, and a resident of Mianus, in the county of Fairfield and State of Connecticut, have invented a new and Improved Coffee-Hopper, of which the following is a full, clear, and exact description.

This invention relates to coffee-hoppers; and the object of the invention is to produce a hopper adapted to contain coffees of different kinds and provided with means for mixing them in various proportions and at the same time weighing the mixture.

The invention consists in the construction and combination of parts to be more fully described hereinafter and definitely set forth in the claim.

Reference is to be had to the accompanying drawings, forming a part of this specification, in which similar characters of reference indicate corresponding parts in all the figures.

Figure 2:
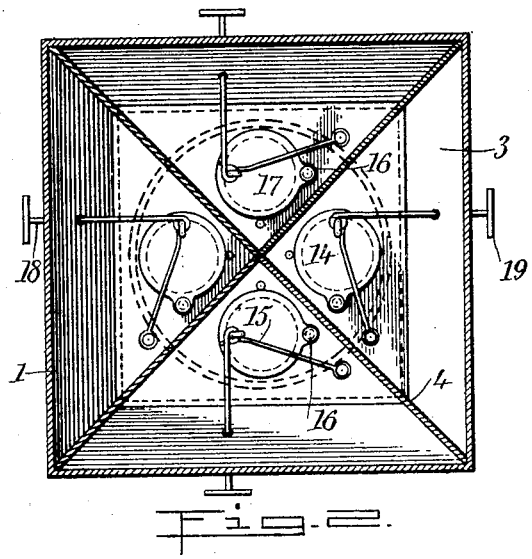
Figure 3:
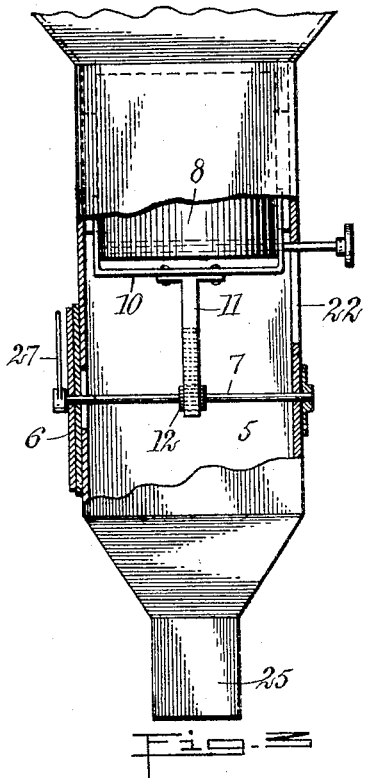

Figure 1 is substantially a central vertical section through a hopper constructed according to my invention, the lower portion of the device being shown in front elevation. Fig. 2 is a horizontal cross-section taken substantially upon the line 2 2 of Fig. 1; and Fig. 3 is a side elevation of the lower portion of the hopper, certain parts being broken away and shown in section.

Referring more particularly to the parts, 1 represents the body of the hopper, which is of the usual form, presenting inclined sides 2. The interior of this hopper is divided into four compartments 3 by means of diagonally-disposed partitions or walls 4, which meet at the center of the hopper, as indicated most clearly in Fig. 2. Beneath the body of the hopper a trunk or tubular casing 5 is formed, which extends vertically downwardly, as indicated. At a suitable point on the side of this trunk a spring-actuated scale 6 of any common form is attached, the said scale having a spindle 7, which extends through the trunk, as indicated. Within the trunk, above this scale and beneath the bottom $1^a$ of the hopper-body, there is mounted a weighing cup or receiver 8. This receiver is adapted to slide longitudinally within the trunk, and for this purpose guiding-strips 9 are provided at the sides, as indicated in Fig. 1. This cup 8 has a cylindrical body, to the lower portion of which a yoke 10 is attached, and this yoke is provided at a suitable point with a downwardly-projecting rack 11, the teeth whereof are in mesh with a pinion 12, which is rigidly carried by the spindle 7, as shown in Figs. 1 and 3.

In order to enable the coffee to be run from the compartments 3 into the receiver 8 to be weighed, the aforesaid bottom is provided with openings or outlets 13, located, respectively, in the several compartments, and these openings are closed by sliding shutters 14, the said shutters being normally maintained closed by springs 15, as shown in Fig. 2. The shutters are pivotally mounted, as at the point 16, and the springs operate to hold their inner edges against stops 17, projecting from the bottom, as will be readily understood. At points opposite to the pivot-points of these shutters draw-rods 18 are provided, which extend horizontally and pass through openings in the hopper-body to the outside, the said draw-rods being provided with heads 19, adapted to be seized for drawing the same outwardly, as will be readily understood. When they are drawn outwardly, of course the shutters will open and allow a quantity of the coffee to pass through to the receiver.

The bottom of the receiver 8 consists of a disk 20, which is supported practically upon the transverse stem 21, to which it is rigidly attached, the said stem projecting at one side of the trunk through a longitudinally-disposed slot 22. The projecting extremity of this stem is provided with a head 23, which facilitates its being rotated, as will be readily understood. This stem 21 is preferably located at a point removed from the central axis of the disk, and the most remote point of the edge of the disk is supported upon a stop or lug 24, which projects in from the body of the receiver, as indicated in Fig. 1. The trunk 5 terminates below in a reduced neck or spout 25, beneath which a receptacle for the mixture of coffee may be placed.

The hopper is supported upon suitable legs 26, preferably attached to the body thereof, as shown.

To refer again to the scale 6, it should be stated that this scale is of a common form presenting a dial graduated to represent pounds, and with this dial coöperates a hand 27, which is carried rigidly by the aforesaid spindle 7.

The cup 8 is normally held in elevated position by means of springs 30, which are disposed on opposite sides thereof and in the space between the wall of the cup and the trunk 5. The upper extremities of these springs are attached to hooks 31, secured at the lower side of the bottom 1ª, the lower extremities of said springs being attached to studs 32, which are attached to the wall of the cup, as indicated most clearly in Fig. 1. The springs 30 are of course extended when the weight is placed in the cup, and they are of proper strength to indicate by the amount of extension produced the number of pounds received in the cup. This extension is of course registered at the dial 6.

From the arrangement described when a quantity of coffee is allowed to flow into the cup its weight will operate to depress the cup and rotate the spindle 7, so that the hand 27 will indicate the quantity of coffee which is in the receiver. Thus it will be possible to measure two pounds of Mocha, for instance, and three pounds of Java. In this way mixtures of any proportion may be made. As the receiver descends with the weight of the coffee which it supports the scale of course indicates the successive quantities of the mixture, and the slot 22 permits the receiver to descend to the limit of the capacity of the receiver and scale. When desired, the contents of the receiver may be dumped simply by rotating the head 23 in the proper direction.

Special attention is called to the arrangement for supporting the dumping-bottom of the receiver with respect to the feature of bringing the center of gravity of the weight between the points of support. In this way there is no tendency for the bottom to dump itself simply by the weight of the coffee.

Having thus described my invention, I claim as new and desire to secure by Letters Patent—

A hopper for coffee comprising a body, and a trunk therebelow, a cup mounted in said trunk, a scale actuated by said cup, said cup having a dumping-bottom, and a stem projecting from said bottom and adapted to dump the same, said trunk having a slot through which said stem passes.

In testimony whereof I have signed my name to this specification in the presence of two subscribing witnesses.

GEORGE W. PHILLIPS.

Witnesses:
  GEO. E. BRUSH,
  C. C. CHALKER.